US009222585B2

(12) United States Patent
Christmann

(10) Patent No.: US 9,222,585 B2
(45) Date of Patent: Dec. 29, 2015

(54) VALVE CONTROL DEVICE

(75) Inventor: Ralf Christmann, Kaiserslautern (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 13/704,753

(22) PCT Filed: Jul. 1, 2011

(86) PCT No.: PCT/US2011/042733
§ 371 (c)(1),
(2), (4) Date: Dec. 17, 2012

(87) PCT Pub. No.: WO2012/006224
PCT Pub. Date: Jan. 12, 2012

(65) Prior Publication Data
US 2013/0092863 A1 Apr. 18, 2013

(30) Foreign Application Priority Data
Jul. 7, 2010 (DE) .................. 10 2010 026 333

(51) Int. Cl.
F16K 37/00 (2006.01)
F16K 7/16 (2006.01)
F02M 25/07 (2006.01)
F16K 31/126 (2006.01)

(52) U.S. Cl.
CPC .............. *F16K 7/16* (2013.01); *F02M 25/0774* (2013.01); *F16K 31/1262* (2013.01); *F16K 37/0033* (2013.01); *F16K 37/0041* (2013.01); *Y02T 10/121* (2013.01); *Y10T 137/8242* (2015.04)

(58) Field of Classification Search
CPC ... F16K 7/16; F16K 37/0041; F16K 37/0033; F16K 31/1262; F02M 25/0774; Y10T 137/8242; Y02T 10/121
USPC .......... 251/61.5, 61.2, 61, 331, 337, 58, 61.4; 137/554, 553; 324/207.24; 92/99, 100, 92/101, 102, 103 SD
See application file for complete search history.

(56) References Cited

U.S. PATENT DOCUMENTS

| 3,039,399 | A | * | 6/1962 | Everett ........................... 417/536 |
| 4,056,043 | A | * | 11/1977 | Sriramamurty et al. ........ 92/13.2 |
| 4,198,028 | A | * | 4/1980 | Cook ............................... 251/48 |
| 4,198,030 | A | * | 4/1980 | Jackson et al. ................ 251/61.5 |
| 4,363,463 | A | * | 12/1982 | Moon, Jr. ......................... 251/61 |
| 5,002,086 | A | * | 3/1991 | Linder et al. .................... 137/312 |
| 5,082,238 | A | * | 1/1992 | Grooms et al. ............... 251/61.5 |
| 5,280,872 | A | * | 1/1994 | Yamanaka .................... 251/61.5 |
| 5,363,743 | A | * | 11/1994 | Raddatz et al. ............... 92/98 D |

(Continued)

FOREIGN PATENT DOCUMENTS

JP        2000-046008 A        2/2000

*Primary Examiner* — John K Fristoe, Jr.
*Assistant Examiner* — Andrew J Rost
(74) *Attorney, Agent, or Firm* — A. Michael Tucker; Stephen A. Pendorf; Patent Central LLC

(57) ABSTRACT

The present invention relates to a valve control device (1) having a housing (2) which has a vacuum chamber (3) and an atmospheric pressure chamber (4) which are separated from one another in a gas-tight manner by a spring-loaded diaphragm (5); having a diaphragm plate (8) arranged on the diaphragm (5); and having a regulating rod (6) which, in the region of a regulating rod head (6A), is operatively connected to the diaphragm (5), wherein the diaphragm plate (8) is formed as a plastic injection-molded part.

8 Claims, 1 Drawing Sheet

(56) References Cited

U.S. PATENT DOCUMENTS

| | | | |
|---|---|---|---|
| 5,575,454 A * | 11/1996 | Ushitora et al. | 251/61.5 |
| 5,918,853 A * | 7/1999 | Yamabe et al. | 251/61.5 |
| 5,975,115 A | 11/1999 | Schwegler et al. | |
| 6,352,019 B1 | 3/2002 | Hasegawa et al. | |
| 7,423,421 B2 * | 9/2008 | Reichert et al. | 324/207.24 |
| 2007/0257219 A1 * | 11/2007 | Perrin | 251/61.5 |
| 2009/0140730 A1 | 6/2009 | Newman et al. | |
| 2010/0101225 A1 * | 4/2010 | Christmann | 60/602 |

* cited by examiner

VALVE CONTROL DEVICE

BACKGROUND OF THE INVENTION

1. Field of the Invention

The invention relates to a valve control device.

2. Description of the Related Art

A control device of said type is known from EP 1 491 754 A1. Such control devices, which are also referred to as control capsules, have a vacuum chamber which is arranged in a housing and which is connected to a vacuum source, for example to the vacuum pump of an engine. Arranged in said vacuum chamber is a diaphragm which is preloaded in one direction by a spring. The diaphragm separates the vacuum chamber from a second pressure chamber which can be connected to the atmosphere or to a further vacuum source. The diaphragm is connected via a diaphragm plate composed of metal to a regulating rod which for example actuates the shut-off element of a bypass valve. For this purpose, a vacuum is built up in the vacuum chamber, as a result of which the diaphragm is deformed counter to the spring force and the regulating rod is thereby moved.

It is therefore an object of the present invention to provide a control device, which control device allows the production outlay thereof to be reduced.

BRIEF SUMMARY OF THE INVENTION

According to the invention, the reduction in production outlay is obtained firstly in that the diaphragm plate is formed not from metal but rather as a simple plastic injection-molded part.

Preferably, during the course of the production of the diaphragm plate composed of plastic, the regulating rod head of the regulating rod is encapsulated by injection molding by the plastic material, such that the regulating rod can be connected to the diaphragm plate at the same time as the latter is being produced.

To connect the unit composed of diaphragm plate and regulating rod to the diaphragm, the diaphragm rod is firstly inserted through a central recess of the diaphragm, and a connection of the diaphragm and diaphragm plate is subsequently realized by means of the latching of fixing sections of the diaphragm in the region of the central recess thereof through a groove in the plastic material surrounding the regulating rod head.

The control device according to the invention may in principle be used for any type of valves, but in particular for the actuation of turbocharger exhaust-gas bypass valves, of exhaust-gas recirculation valves and of valves by means of which fresh air can be controlled.

The subclaims relate to advantageous refinements of the invention.

BRIEF DESCRIPTION OF THE SEVERAL VIEWS OF THE DRAWINGS

Further details, advantages and features of the present invention will emerge from the following description of an exemplary embodiment on the basis of the drawing, in which.

DETAILED DESCRIPTION OF THE INVENTION

Figure 1:
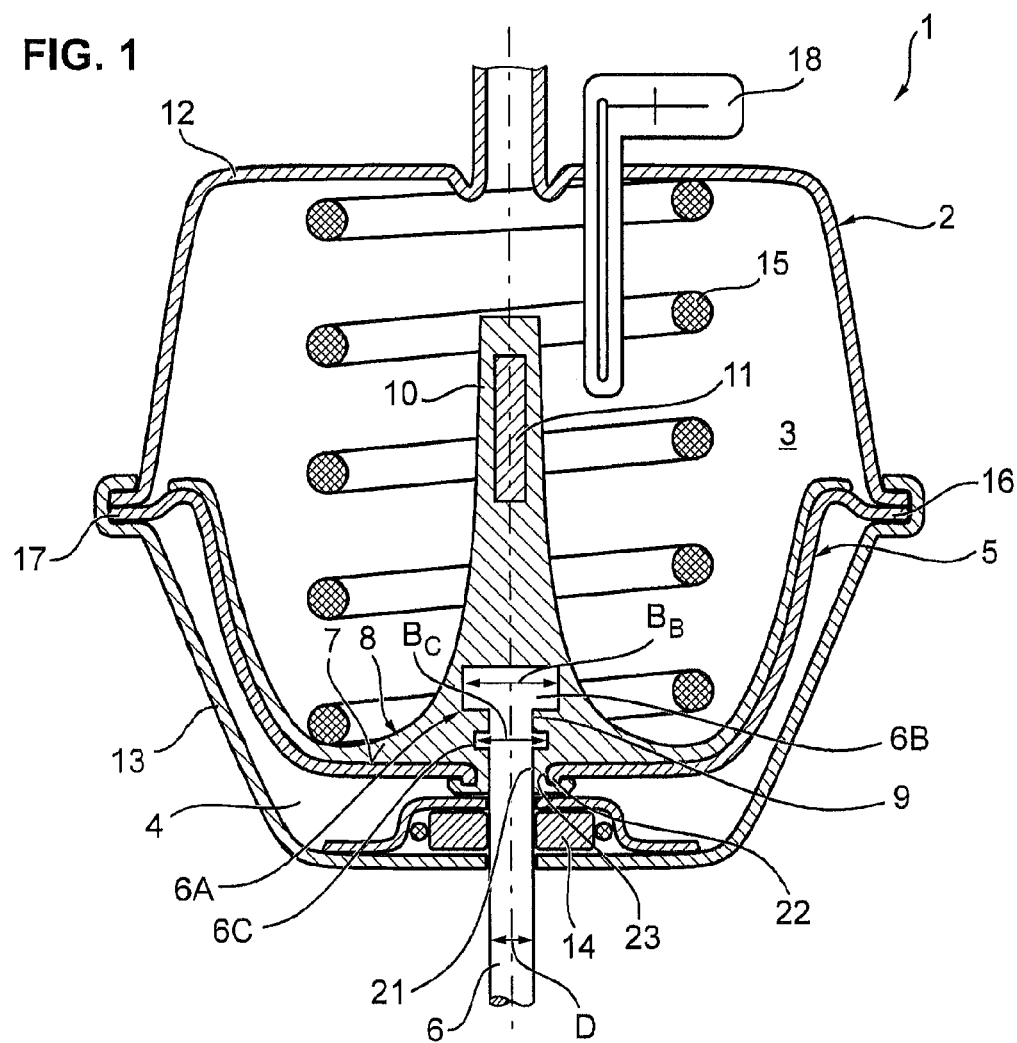
FIG. 1 shows a schematically slightly simplified sectional illustration through a control device or control capsule according to the invention.

The control device 1 according to the invention serves for example for the actuation of bypass valves or of the shut-off elements of bypass valves of said type, which are used in exhaust-gas turbochargers.

The control device 1 has a housing 2 in which, in the example, a vacuum chamber 3 is arranged in the upper part. The vacuum chamber 3 is separated from a pressure chamber 4, which is at atmospheric pressure, by a spring-loaded diaphragm 5.

The vacuum chamber 3 is delimited by an upper housing part 12 and the pot-shaped diaphragm 5. A compression spring 15 is arranged in the vacuum chamber 3.

The atmospheric pressure chamber 4 is delimited by the diaphragm 5 and by a second housing part 13 situated below the upper housing part 12, wherein the diaphragm 5 is clamped, at its free circumferential end regions 16 and 17, by said two housing parts 12 and 13.

As can be seen from FIG. 1, the diaphragm 5 has a diaphragm surface 7 pointing toward the vacuum chamber 3, and is also provided with a passage recess 21 for a regulating rod head 6A of the regulating rod 6. As shown by the Figure, the regulating rod head 6A is connected to a diaphragm plate 8 by encapsulation by injection molding.

To connect the unit composed of diaphragm plate 8 and regulating rod 6, the regulating rod 6 is initially inserted through the passage recess or central recess 21 of the diaphragm. For final fixing, a fixing section 22, which is arranged adjacent to the passage recess 21, of the diaphragm 5 engages into a groove 23 of the plastic material of the diaphragm plate 8. Said latching is possible on account of the elasticity of the diaphragm 5, such that a type of "snap-action latching connection" is generated which, moreover, seals off the central recess or passage recess 21, as can be seen in detail from the illustration of FIG. 1. In said final assembled state, the diaphragm plate 8 covers the diaphragm surface 7, as can likewise be seen in detail from the diagrammatic illustration of FIG. 1. Said Figure also shows that, in the final assembled state, the compression spring 15 rests with its lower end on the diaphragm plate 8, while the upper end of said compression spring is supported on the upper housing part 12.

To improve the retaining action, the regulating rod head 6A has, in the illustrated particularly preferred exemplary embodiment, a first anchoring section 6B at a face-side end 9 projecting into the vacuum chamber 3. The diameter $B_B$ of said anchoring section 6B is larger than the diameter D of the regulating rod 6.

Provided below said first anchoring section 6B is a second anchoring section 6C whose diameter $B_C$ is likewise larger than the diameter D of the regulating rod 6. The fixing of the regulating rod 6 in the diaphragm plate 8 is further improved by said two anchoring sections 6B and 6C.

As can also be seen from FIG. 1, the diaphragm plate 8 is provided with a receiving region 10 which, in the example, is arranged centrally and projects in the manner of a tower into the vacuum chamber 3. A magnet 11 for position detection is arranged in said receiving region 10. Said arrangement may take place during the course of the encapsulation by injection molding of the regulating rod head 6A and the production of the diaphragm plate 8.

Figure 2A:
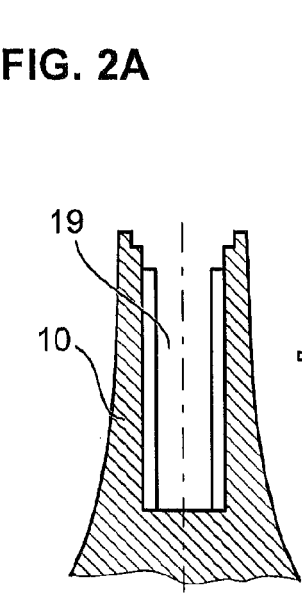
FIGS. 2A-2C show schematically simplified illustrations of a receiving region of a diaphragm plate of the control device according to FIG. 1 for explaining an alternative possibility for the insertion of a magnet into said receiving region.
Figure 2B:
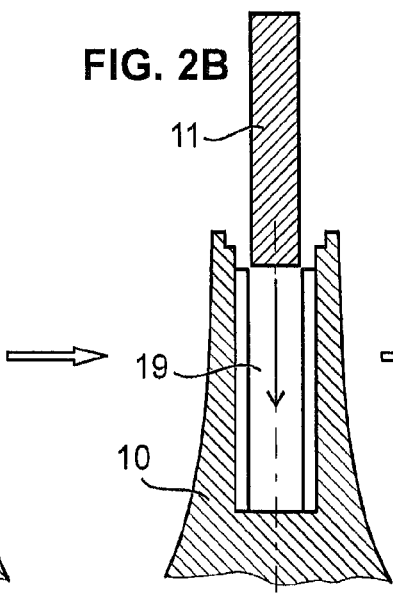
Figure 2C:
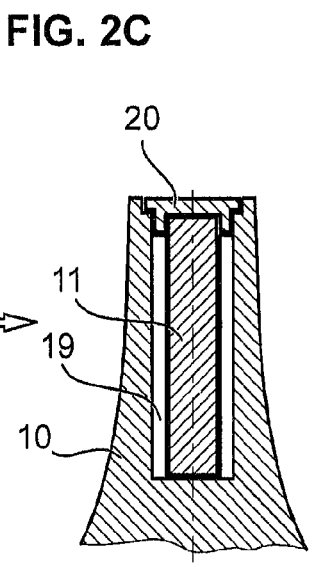

FIGS. 2A to 2C show an alternative possibility for the embedding of the magnet 11. In this case, the upwardly projecting receiving region 10 has a chamber 19 which, in the state shown in FIGS. 2A and 2B, is upwardly open. Accordingly, according to the illustration of FIG. 2B, the magnet 11 can be pushed into the chamber 19 from above.

According to the illustration of FIG. 2C, said pushing-in process is complete, such that the magnet 11 is received in the chamber 19. Said chamber 19 in turn can now be closed off by means of a cover 20. Said cover 20 may for example be laser-welded or may also be produced by casting.

In addition to the above written disclosure of the invention, reference is hereby explicitly made to the diagrammatic illustration thereof in FIGS. 1, 2A, 2B and 2C.

LIST OF REFERENCE SYMBOLS

1 Control device/control capsule
2 Housing
3 Vacuum chamber
4 Atmospheric pressure chamber
5 Diaphragm
6 Regulating rod
6A Regulating rod head
6B First anchoring section
6C Second anchoring section
7 Diaphragm surface
8 Diaphragm plate
9 Face-side end
10 Receiving region
11 Magnet
12, 13 Housing regions
14 Sliding bush
15 Compression spring
16, 17 End regions
18 Vacuum port
19 Chamber
20 Cover
21 Passage recess
$B_B$, $B_C$, D Diameter

The invention claimed is:

1. A valve control device (1)
    having a housing (2) which has a vacuum chamber (3) and an atmospheric pressure chamber (4) which are separated from one another in a gas-tight manner by a spring-loaded diaphragm (5) having first and second opposing surfaces, the first surface in fluid contact with the vacuum chamber (3) and the second surface in fluid contact with the atmospheric pressure chamber (4);
    having a one-piece diaphragm plate (8) arranged to contact the first (7) and second surfaces of the diaphragm (5); and
    having a regulating rod (6) which, in the region of a regulating rod head (6A), is operatively connected to the diaphragm (5), wherein
    the diaphragm plate (8) is formed as a plastic injection-molded part,
    the regulating rod head (6A) is connected to the diaphragm plate (8) by being non-releasingly encapsulated by the diaphragm plate by injection molding of the plastic material of the diaphragm plate,
    the diaphragm plate is provided with a groove (23) in the vicinity of the regulating rod,
    the diaphragm (5) is provided with a fixing section (22) comprising a passage opening (21) adapted for resilient sealing engagement in the groove (23), and
    the diaphragm (5) is resiliently sealed in the groove (23) as the first (7) and second surfaces of the diaphragm (5) contact the one-piece diaphragm plate.

2. The valve control device as claimed in claim 1, wherein the regulating rod head (6A) has, at an end (9) projecting into the vacuum chamber (3), a first anchoring section (6B) whose diameter ($B_B$) is larger than the diameter (D) of the regulating rod (6).

3. The valve control device as claimed in claim 2, wherein the regulating rod head (6A) has, below the first anchoring section (6B), a second anchoring section (6C) whose diameter (Be) is larger than the diameter (D) of the regulating rod (6).

4. The valve control device as claimed in claim 1, wherein the entire diaphragm first surface (7) is covered by the diaphragm plate (8).

5. The valve control device as claimed in claim 1, wherein the diaphragm (5) has a passage recess (21) for the regulating rod head (6A), which passage recess (21) is closed off by the material of the diaphragm plate (8).

6. The valve control device as claimed in claim 1, wherein the diaphragm plate (8) has a receiving region (10) containing a magnet (11) for position detection.

7. The valve control device as claimed in claim 6, wherein the receiving region (10) has a chamber (19) for receiving the magnet, which chamber closed off by means of a cover (20) after the magnet (11) has been inserted.

8. The valve control device as claimed in claim 6, wherein the magnet (11) is embedded in the receiving region (10) during the course of the production of the diaphragm plate (8).

* * * * *